United States Patent Office 3,254,943
Patented June 7, 1966

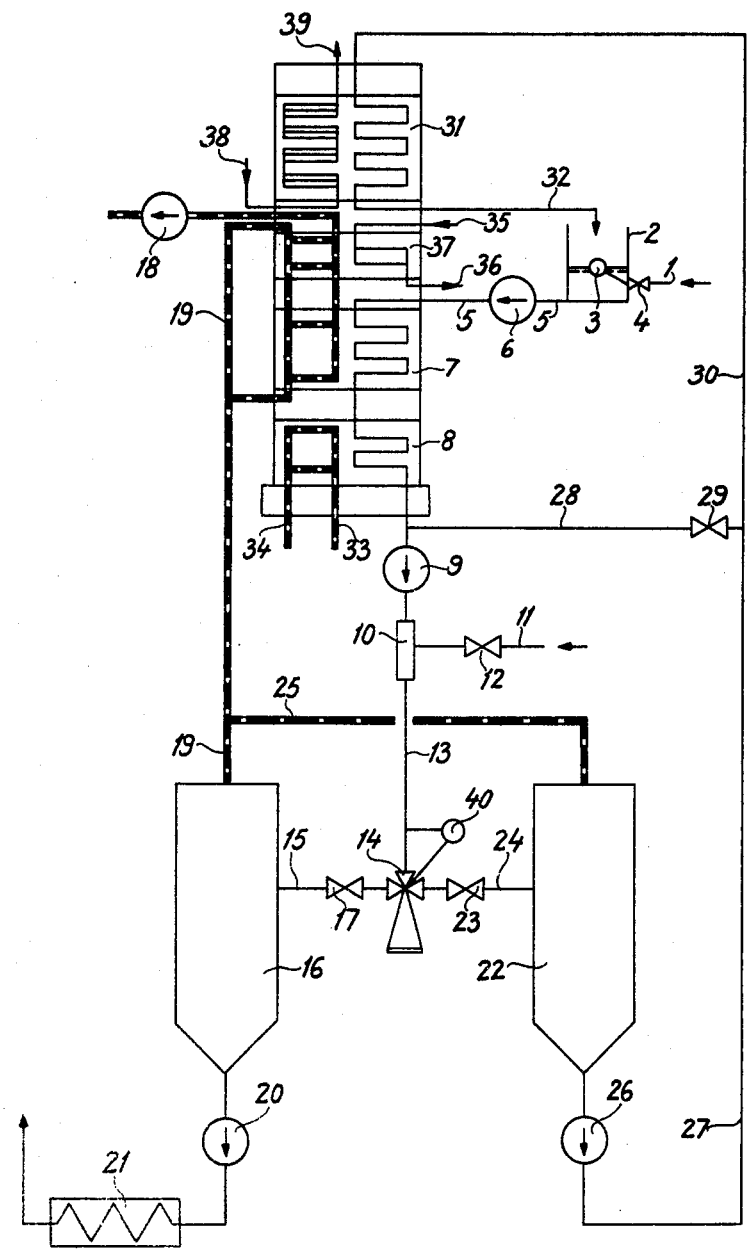

3,254,943
HEAT TREATING APPARATUS FOR LIQUIDS
Bengt Arne Palm, Malmo, Sweden, assignor to Aktiebolaget Separator, Stockholm, Sweden, a corporation of Sweden
Filed Nov. 28, 1962, Ser. No. 240,647
Claims priority, application Sweden, Dec. 4, 1961, 12,076/61
5 Claims. (Cl. 21—94)

The present invention relates to a method and apparatus for heat treatment of liquids to render micro-organisms therein innocuous. It relates more particularly to such a method and apparatus wherein the liquid, by direct injection of steam therein, is first brought to a predetermined temperature and maintained at that temperature for a certain time interval, after which the condensed steam in the liquid is removed therefrom by evaporation in a vessel under vacuum, while dropping the temperature of the liquid, the liquid being finally discharged into a storage vessel, possibly after further treatment.

Liquids treated in such way are milk, fruit juices and other nutritive liquids as well as medical liquids. The heating to the temperature which has been predetermined for each liquid and the maintaining of the liquid at that temperature for a time interval predetermined for each liquid are intended to kill at least certain micro-organisms contained in the liquid so that the liquid, after returning to a lower temperature and being packaged in closed containers, can be stored without becoming spoiled or being subjected to any alterations. The purpose may be a pasteurization or a sterilization of the liquid, or other purposes. The evaporation of the liquid in the vessel under vacuum has two purposes. The first is to relieve the liquid from all the condensed steam so that the liquid, after having been subjected to the heat treatment, has the same proportion of dry-substance as it had prior to the steam injection. The second purpose of the evaporation is to cool the liquid rapidly, because a number of liquids, such as those containing albumin, do not stand being kept for any great length of the time at a high temperature without undergoing a transformation. Thus, albumin coagulates when being kept for any great length of time at 100° C. or more, but it does not coagulate when the exposure time is about three seconds. For other liquids the conditions are similar with regard to other components.

When liquids are submitted to such a heat treatment, it sometimes happens that the pressure or the temperature of the steam drops or that the supply of steam required for heating the liquid is insufficient. As a result, the liquid to be heat-treated never reaches the predetermined temperature required for rendering the micro-organisms innocuous. The heat treatment must then be discontinued, the part of the liquid which has been insufficiently heat-treated must be removed, and the apparatus must be disassembled, cleaned, disinfected and reassembled before the heat treatment of new liquid can be resumed. All these operations are time-consuming, toilsome and expensive.

In order to prevent such a failure, it is possible to control the delivery rate of the liquid by means of automatic devices so that the desired temperature is always reached by steam injection, but in that case the remaining parts of the plant must be automatically adjusted for the reduced throughput, which requires a very complicated and expensive apparatus if a reliable result is to be obtained.

According to the present invention, these drawbacks are eliminated in that the liquid being heated, in case it does not reach the predetermined temperature, is diverted, before it reaches the vessel under vacuum, to a return line including another vessel under vacuum where the steam condensed in the liquid by the steam injection is removed therefrom by evaporation, after which the liquid is returned by this line to the steam injection for reheating. Since waste heat often is available in a factory, the liquid can suitably be pre-heated in a heat exchanger by means of waste heat before it is heated by direct steam injection, whereby high-pressure steam used for the injection can be saved. If the liquid is subjected to a preheating process, the liquid reconveyed through the return line can be fed into the system at any point before the place where the heating by steam injection occurs, provided that the returned liquid (possibly by cooling) is previously brought to the same temperature as that of the liquid it is joined with, since the temperature balance in the plant would otherwise be disturbed. If the liquid is pre-heated in a heat exchanger, the returned liquid can thus be reintroduced before or after the heat exchanger or in any stage in the heat exchanger.

Since the steam which is evaporated in both vessels under vacuum constitutes waste steam, this steam can be rendered useful by leading it through the heat exchanger used for the pre-heating of the liquid, so that it can transmit a major part of its heat content to the liquid.

When the liquid, after steam injection, has reached the predetermined temperature, it is lead to one of the vessels subjected to vacuum, but should this temperature not be reached, the liquid is led to the other vessel under vacuum. This control can be effected by manual operation of a three-way valve; but according to the invention it can also be effected automatically through actuation of the three-way valve by a control member which, in response to the temperature of the liquid after the steam injection, positions the valve in one position for connecting the liquid outlet of the steam injection device with only one of the vacuum vessels or in a second position for connecting said outlet with only the other of the vacuum vessels, depending upon such liquid temperature.

For a better understanding of the invention, reference may be had to the accompanying drawing in which the single illustration is a schematic view of a preferred apparatus for practicing the new method.

Referring to the drawing, reference numeral 1 designates a pipe for supplying to a container 2 the liquid to be heat-treated. Reference numeral 3 designates the float of a valve 4 which maintains a constant liquid level in the container 2. From the container 2 the liquid is delivered by pump 6 and pipe 5 through the sections 7 and 8 of a heat exchanger in which the liquid is pre-heated. From section 8 the pre-heated liquid is passed by pump 9 through a steam injection device 10 in which the liquid is heated to the desired temperature by direct injection of steam into the liquid. The steam is supplied by a pipe 11 which is provided with a cut-off valve 12. From the steam injection device 10, the liquid is led through a pipe 13 to a three-way valve 14 from which the liquid, if the required temperature has been reached, is passed through a pipe 15 to a vacuum vessel 16 by way of a cut-off valve 17. A vacuum suction pump 18 is connected by a pipe 19 to the vessel 16 to maintain it continuously under vacuum. The vessel 16 constitutes an expansion vessel for the liquid fed into the vessel by the pipe 15, the vacuum being sufficient to boil the liquid in the vessel and remove from it all the steam which has condensed in the liquid in connection with the steam injection at 10. The steam is exhausted by pump 18 while the liquid is discharged from the bottom of vessel 16 by a pump 20. This discharged liquid is cooled in a cooling device 21 and, possibly after a subsequent treatment (such as homogenization), is drawn into closed vessels or bottles (not shown).

If the liquid in the pipe 13 has not reached the required temperature, the valve 14 is moved manually or automatically so that the liquid, instead of being led to the vessel 16, is led to a vacuum vessel 22 through a cut-off valve 23 and pipe 24. The vessel 22 communicates with a vacuum pipe 25, which may be connected to the vacuum pump 18 through pipe 19, whereby the vessel 22 also is continuously subjected to vacuum, preferably the same vacuum as in the vessel 16. Thus, the vessel 22 likewise serves as an expansion vessel where the liquid rapidly starts to boil so as to remove therefrom the steam condensed in the liquid as a result of the steam injection at 10. The steam is exhausted through the pipe 25 while the liquid is discharged from the bottom of vessel 22 by a pump 26 in pipe 27. The latter returns the liquid to steam injector 10 for reheating, either directly through pipe 28 and cut-off valve 29, or indirectly through a pipe 30 leading to a heat exchanger section 31 where the liquid is cooled and thereafter returned to the vessel 2 through pipe 32. The cooling brings the liquid to the temperature prevailing in the vessel 2. Alternatively, after the liquid has been cooled in the section 31, it can be admitted at any point of the liquid path through the sections 7 and 8 of the heat exchanger, provided that the liquid has been cooled to the temperature prevailing at that point.

The insufficiently heated liquid is thus returned by the return line, including vessel 22 and pipe 27, to the steam injection device 10 where it is reheated. It then flows to the vessel 16 if a sufficiently high temperature has now been reached. Otherwise, it is again recirculated through the vessel 22 and pipe 27 until the defect regarding the steam injection has been remedied.

The section 7 of the heat exchanger is heated by steam supplied by the pipe 19, while the section 8 is heated by live steam supplied by a pipe 33 and discharged through a pipe 34. A cooling medium is supplied at 35 and discharged at 36, which medium exerts a cooling effect on the steam in the last part of the pipe 19 in a section 37 of the heat exchanger. Another medium preferably water) is supplied at 38 and discharged at 39, which medium, in the section 31 of the heat exchanger, exerts a cooling effect on the liquid returned through the pipe 30.

The three-way valve 14 can be moved manually between its two positions. By means of a thermometer (not shown) in the pipe 13, it is possible to determine when the valve 14 is to be moved to one or the other of its two positions. This manual control can advantageously be replaced by a conventional thermostatic control member 40 responsive to temperature changes in the liquid flowing through the pipe 13, and which actuates the three-way valve 14 to its position for connecting pipe 13 to vessel 22 when the liquid temperature becomes too low, and returns the valve to its normal position for connecting pipe 13 to vessel 16 when the liquid again reaches the predetermined temperature.

When milk, for instance, is to be sterilized, it is first preheated in the sections 7 and 8 up to 75° C. It is then heated by direct injection of high pressure steam in the heating device 10 up to 140° C. The milk thus heated is then allowed to expand in the vessel 16 under vacuum which gives the milk a temperature of about 78° C., whereby the milk after the expansion will have about the same water content as it had prior to the steam injection. The same vacuum is also maintained in the vessel 22 and, owing to the fact that the vessels 16 and 22 inter-communicate through the pipe 19 and 25, the quantity of evaporated steam (used as heating medium in the section 7) will always remain essentially constant independently of which of the vessels 16 and 22 the milk is flowing to.

I claim:

1. Apparatus for heat treating a liquid to render microorganisms therein innocuous, which comprises a steam injection device having a liquid outlet, a feed line leading to said device for passing the liquid therethrough to heat the liquid by steam injection, first and second vacuum vessels, means for maintaining said vessels under vacuum, a three-way valve connected between said vessels and said outlet of the steam injection device, said valve being operable selectively to connect said outlet to either one of said vessels while disconnecting the outlet from the other vessel, a liquid discharge pipe leading from said first vessel, and a return pipe leading from said second vessel to said feed line for returning liquid to the steam injection device.

2. Apparatus according to claim 1, comprising also a thermostatic control member responsive to the temperature of the liquid from said outlet and operatively connected to said valve for actuating it.

3. Apparatus according to claim 1, comprising also adjustable valves connected beteen the three-way valve and the respective vessels.

4. Apparatus according to claim 1, comprising also a heat exchanger in said feed line.

5. Apparatus according to claim 1, in which said means for maintaining the vessels under vacuum include a vacuum pump, the aparatus also including a heat exchanger in said feed line for preheating the liquid, the pump being connected to said vessels through said heat exchanger.

References Cited by the Examiner

UNITED STATES PATENTS 2,846,320  8/1958  Wittwer _____ 99—216 X
3,101,041  8/1963  Hallstrom _____ 99—216 X MORRIS O. WOLK, *Primary Examiner.*

F. W. BROWN, *Assistant Examiner.*